2,797,850

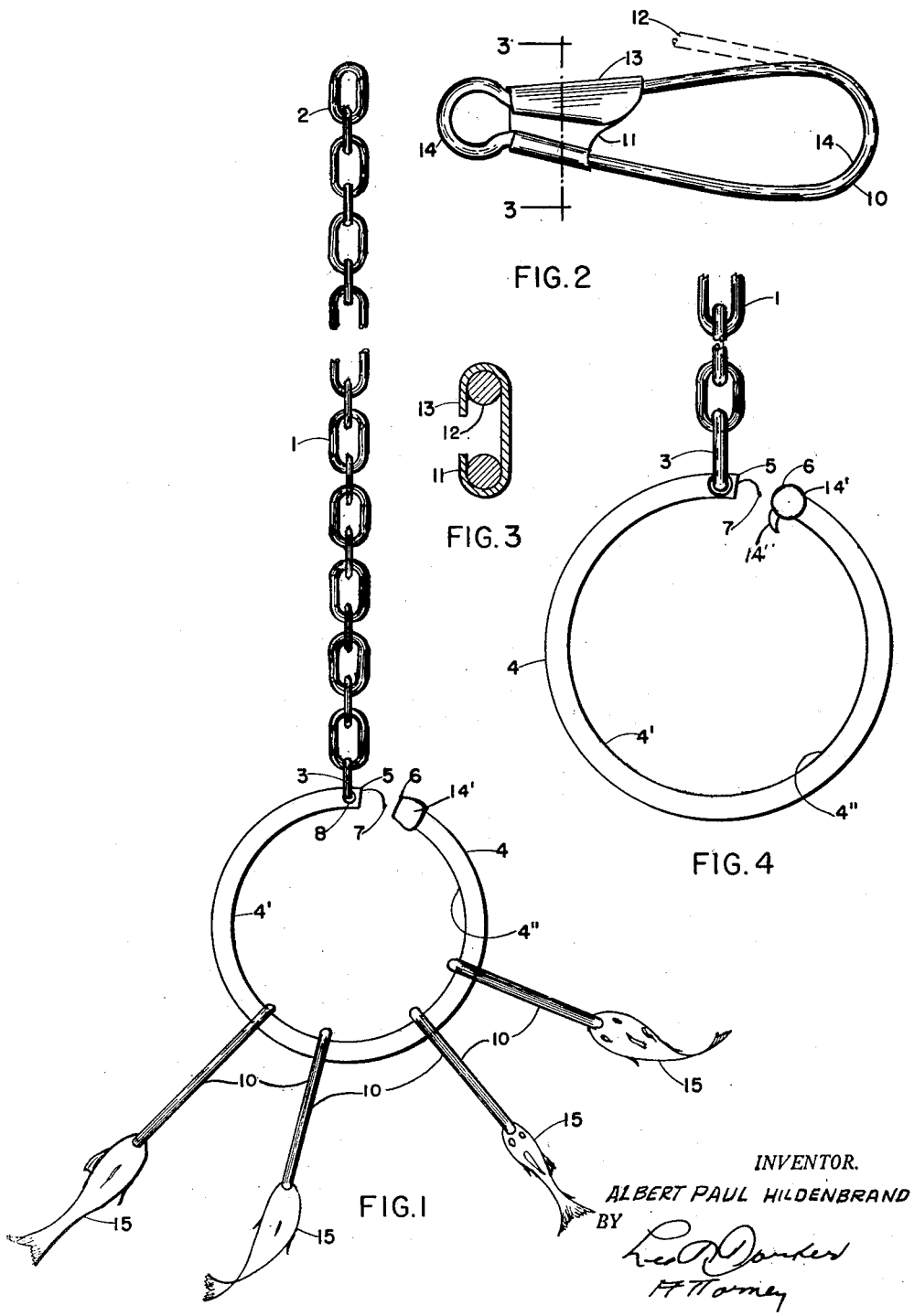

FISH STRINGERS

Albert Paul Hildenbrand, Cincinnati, Ohio

Application December 22, 1954, Serial No. 476,891

1 Claim. (Cl. 224—7)

Heretofore, considerable efforts have been made by various persons and fishermen to provide a fish stringer that has the advantages, as follows: First, a fish stringer that will enable fish strung thereon to remain alive a relatively long period of time; second, a fish stringer that gives strung fish freedom to move about in the water in which they are retained; third, a fish stringer on which fish may be attached and deposited in the water without removing previously strung fish from the water; and, fourth, a fish stringer which is economical to manufacture and durable when in use.

An important object of the invention is to provide simple, efficient, practical and economical means by which caught or captured fish can be retained in captivity relatively free and separated from one another while swimming in the water in which they are deposited.

Other objects of the invention are to provide a fish stringer by means of which the fish may be secured in place without lifting the fish previously caught out of the water.

A still further object of the invention resides in providing a plurality of fasteners or fish-retaining devices slideable along a tether whose upper end may be attached to a spike in the bank of a water stream, pond or lake, or secured to the gunwhale of a boat, and said fasteners being automatically slidable downwardly on the tether and onto a ring or support fixed to the lower end of the tether.

Further objects and details of the invention will be apparent from a consideration of the accompanying specification, claim, and drawings.

The invention consists in the combination of the elements, arrangement of parts and in the details of the construction, as hereinafter claimed.

In the drawings:

Fig. 1 is an elevational view showing my invention in use;

Fig. 2 is a front elevational view of the safety-pin type fish hook or retainer. The dotted lines indicate the hook in open position for the reception of a fish, and part of the device being shown in cross section.

Fig. 3 is a sectional view taken on the line 3—3 of Fig. 2; and

Fig. 4 is an enlarged view of the lower end of the chain or tether with the open ring attached thereto.

In the preferred construction of the invention I provide the chain or tether 1 which may have its upper end, or link, 2 normally secured to a suitable support as a spike (not shown) which has been driven into the bank (not shown) of a body of water which may be a lake, running stream, pond, or the like.

Secured to the lower end or link 3 of the tether 1 is the open rigid or non-resilient ring, support or a tracheal like body 4 which is incomplete in a part of its circumference. The ring or support 4 comprises a body 4' with a comparatively large central opening 4'. The ring 4 has the ends 5 and 6 spaced apart from each other to provide the opening or space 7. In the end 5 near or adjacent the opening 7 is the hole 8 which receives the lower link 9 of the tether 1 whereby the ring is secured to the tether near or adjacent to space 7 without obstructing the space 7. I provide the fish fastener, retainer, or fish-retaining device 10 which, as hereinafter explained, is free to slide down the tether 1, by gravitation, pass through the space 7 and finally be retained or secured to the ring 4.

The fish-retaining device or retainer 10 appears to be an enlarged safety-pin. The retainer comprises a bent spring wire shaped to the form shown in Fig. 2 and held in such position by the clamp-catch 11. The free end 12 of the wire is adapted to seat in the U-shaped catch 13. The loop 14 is formed when fabricating and bending the wire. The loop 14 receives the upper end 2 of the tether 1, after the upper end 2 is manually removed from a spike (not shown) or other object to which it is attached, whereby the retainer 10 is free to slide, by gravitation, down the tether 1 and onto the ring 4.

The enlargement or cap 14' is attached to the end 6, of the ring 4. The cap tends to prevent the retainers 10 from slipping off the end 6 of the ring and through the space 7.

In Fig. 4 is shown a modification of the invention in which the inwardly projecting hook 14" is fixed to the cap 14' whereby the retainers 10 are prevented from sliding or moving off the end 6, of the ring, and into the space 7. Any suitable means may be used to prevent the retainers from sliding off the end 6 of the ring.

The operation of the invention is, as follows: When a fish 15 is caught the free end 12 of the retainer 10 is manually opened to the position represented by dotted lines in Fig. 2. Then the free end is passed through the gills or lip of the fish, after which the free end 12 is manually closed to the position represented by full lines in Fig. 2. Then the upper end or link 2 of the tether is manually inserted into the loop 14 of the retainer 10 and by gravitation both the retainer 10 and the fish 15 slide downwardly on the tether 1 until the wire, which forms the loop 14, passes through the space 7 and onto the ring 4. The ring being rigid no movement of the ends 5 and 6, with respect to each other, is accomplished when the wire loop 14 passes onto the ring 4. The same operation may be accomplished or repeated each time a fish is caught by a fisherman using a plurality of the retainers 10. In other words, one retainer can be used on each caught fish, and a plurality of fish can be attached to the ring 4, as shown in Fig. 1.

An important advantage of the invention is that, as shown in Fig. 1, after the retainers 10 having the fish 15 attached thereto have slid down the tether and onto the ring 4, the loops 14 are free to slide on the ring 4 whereby the fish 15 can swim relatively free and separated from one another.

Another advantage of the invention is that a plurality of retainers 10, each having a fish attached thereto, can be held relatively free from one another on the ring.

Still another advantage of the invention is that after a fisherman attaches a fish to a retainer 10, the fisherman merely inserts the upper end 2 of the tether 1 into the loop 14 of the retainer 10, and the retainer 10 and the fish 15 automatically slide down the tether, the loop 14 passing through the space 7 and onto the ring 4. Normally, the lower end of the tether 1 and the ring 4 are deposited or submerged in water whereby the fish 15 attached to the retainers 10 are kept in captivity in the water without being crowded against each other.

The number of fish that may be attached to the ring 4 can be materially increased by providing a ring having a relatively larger circumference and diameter.

I believe that the form the invention illustrated in the drawings, and referred to in the above description, as the preferred embodiment, is efficient and practicable. However, realizing that the conditions concurrent with the adoption of the invention will vary, I desire to emphasize the fact that changes in the details may be resorted to, without sacrificing any of the advantages of the invention, as defined in the claim. What I claim as new and desire to secure by Letters Patent is:

A fish stringer comprising an open ring, a tether attached to one end of said ring to receive a fish retainer slidable on said tether and onto said ring, and an enlargement on the other end of said ring to prevent said retainer from slipping off the ring.

References Cited in the file of this patent

UNITED STATES PATENTS

| | | |
|---|---|---|
| 129,871 | Stevens | July 23, 1872 |
| 692,167 | Schumacher | Jan. 28, 1902 |
| 2,084,260 | Schupbach | June 15, 1937 |
| 2,473,348 | Sharps | Jan. 14, 1949 |
| 2,574,846 | Scheidt | Nov. 13, 1951 |
| 2,665,042 | Starolis | Jan. 5, 1954 |